Patented Apr. 10, 1945

2,373,602

UNITED STATES PATENT OFFICE 2,373,602

PROTEINACEOUS SURFACE ACTIVE AGENTS AND PROCESS OF MAKING SAME

John B. Rust, West Orange, and Leonard Spialter, Irvington, N. J., assignors to Montclair Research Corporation, a corporation of New Jersey No Drawing. Application June 9, 1944, Serial No. 539,602

6 Claims. (Cl. 260—112)

This invention relates to surface-active agents prepared from partly degraded proteins and to methods of preparing the same.

An object of the invention is the preparation of surface-active agents from naturally occurring proteinaceous raw materials such as gelatin, zein, soya bean meal, blood albumin, egg albumin, and other proteins of both animal and vegetable origin. A further object is the preparation of wetting and detergent agents from scrap protein materials, fish scrap, leather scrap, dried blood, horn, hair, feathers, silk, etc. Another object is the preparation of the agents by an economical process involving a few simple steps with simple apparatus. Still other objects will appear hereinafter.

It is well known that proteins may be hydrolyzed in acid or basic medium. To obtain a partially degraded product a sodium hydroxide solution is often employed. The degraded product, containing some free amino groups and free organic acid radicals, forms a water-soluble salt-like material with the sodium hydroxide. Although the material is water-soluble, it shows little detergent properties because of the hydrophilic nature of the degraded protein. In order to produce a product with detergent properties it is necessary to introduce a suitable hydrophobic radical into the degraded protein molecule. We have found that long-chain alkyl sulfonyl chlorides containing from 9 to 18 carbon atoms, such as kerosene sulfonyl chloride are desirable reagents for the introduction of such a radical. Kerosene sulfonyl chloride may be obtained from the action of a mixture of sulfur dioxide and chlorine on kerosene. It may also be prepared by treating the desired petroeum fractions with sulfonyl chloride. Another method oxidizes keryl mercaptan with chlorine water or kerosene sulfur compounds such as sulfides and the like with nitric acid. Although kerosene petroleum fractions are the preferred materials of the present invention, other long chain aliphatic sulfonyl chlorides may also be used such as those derived from paraffin wax, lubricating oils, or long chain primary sulfonyl chlorides such as octadecyl sulfonyl chloride, dodecyl sulfonyl chloride, and the like.

When the partially degraded protein material, prepared in a sodium hydroxide solution, is treated with kerosene sulfonyl chloride the kerosene $SO_2$-group is joined to the protein material probably through an amino nitrogen atom of the protein. The resulting sodium salt disperses well in water and shows desirable detergent properties.

In the preparation of the above described useful products we use a solution obtained from the partial hydrolysis or degradation of such materials as casein, gelatin, zein, soya bean flour, blood albumin, scrap leather, fish scrap, silk waste, wool or wool waste, etc., together with an aliphatic sulfonyl halide of sufficiently high molecular weight to confer adequate lyophilic properties on the final product. The alkaline solution of the high molecular weight alkali-hydrolysis product of the protein is mixed with the long chain alkyl sulfonyl chloride and the mixture is heated at boiling for from 5 to 30 minutes to form a solution of a reaction product having desirable surface active or detergent properties.

The following examples are illustrative of our invention. All proportions are in parts by weight.

Example 1.—One part of soya bean meal and 5 parts of 15% NaOH solution were boiled for 45 minutes. The mixture was cooled to approximately 80° C. and 1 part of kerosene sulfonyl chloride was added. The mixture was then boiled for 5 minutes. The cooled product dispersed well in water to give a solution with good lathering properties.

Example 2.—One part of zein and 5 parts of 15% NaOH solution were boiled for 5 minutes. A clear, dark-red solution was obtained. The mixture was cooled to 75° C. and 1 part of kerosene sulfonyl chloride was added, after which addition the mixture was boiled for 5 minutes. The cooled sample dispersed well in water with considerable foaming.

Example 3.—One part of gelatin and 5 parts of 15% NaOH solution were boiled for 10 minutes. The mixture was cooled and to it was added 1 part of kerosene sulfonyl chloride. The mixture was next boiled for 5 minutes. When the product was cooled and placed in water, it produced a good foaming solution.

Example 4.—One part of silk waste and 5 parts of 15% NaOH solution were boiled for 30 minutes. After cooling, 1 part of kerosene sulfonyl chloride was added to the mixture and the resulting product was boiled for 5 minutes. The mixture was cooled and a sample placed in water. A good foaming solution was obtained.

We claim:

1. The process of making a solution of a surface active agent which comprises mixing an alkaline solution of a high molecular weight alkali-hydrolysis product of a protein with an alkyl sulfonyl chloride having from 9 to 18 carbon atoms and heating the mixture at boiling for from 5 to 30 minutes to form a reaction product between the protein and the alkyl sulfonyl chloride.

2. The process of claim 1 wherein the alkyl sulfonyl chloride is a kerosene sulfonyl chloride.

3. The process of making a solution of a surface active agent which comprises heating at boiling for between 5 and 30 minutes an aqueous alkaline solution of a high molecular weight alkali-hydrolysis product of zein and a kerosene sulfonyl chloride.

4. The process of making a solution of a surface active agent which comprises heating at boiling for between 5 and 30 minutes an aqueous alkaline solution of a high molecular weight alkali-hydrolysis product of soya bean meal and a kerosene sulfonyl chloride.

5. The process of making a solution of a surface active agent which comprises heating at boiling for between 5 and 30 minutes an aqueous alkaline solution of a high molecular weight alkali-hydrolysis product of gelatin and a kerosene sulfonyl chloride.

6. A surface active agent composition comprising a solution of the reaction product of an alkyl sulfonyl chloride containing from 9 to 18 carbon atoms and an aqueous alkaline solution of a high molecular weight alkali-hydrolysis product of a protein.

JOHN B. RUST.
LEONARD SPIALTER.